March 23, 1926.
M. E. THOMAS
1,577,504
ELECTRICALLY DRIVEN VEHICLE
Filed July 21, 1922
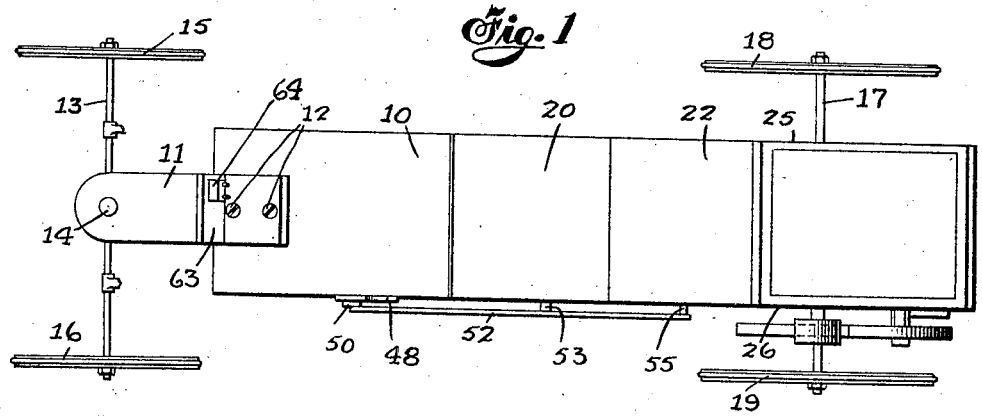
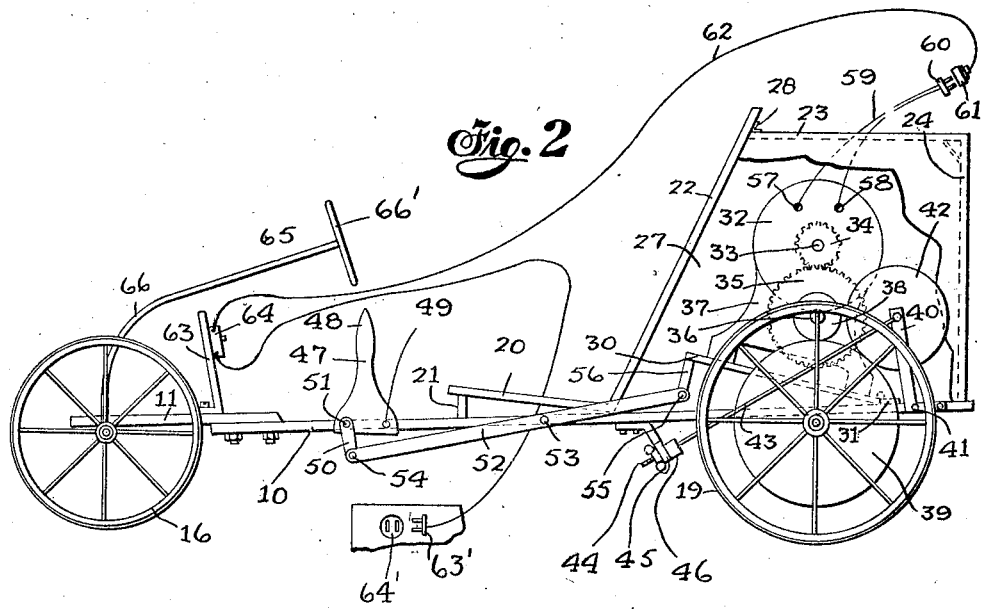

Patented Mar. 23, 1926.

1,577,504

UNITED STATES PATENT OFFICE.

M. EDGAR THOMAS, OF RIVERVIEW MANOR, NEW YORK, ASSIGNOR OF ONE-HALF TO LAWRENCE F. SHERMAN, OF PELHAM MANOR, NEW YORK.

ELECTRICALLY-DRIVEN VEHICLE.

Application filed July 21, 1922. Serial No. 576,584.

*To all whom it may concern:*

Be it known that I, M. EDGAR THOMAS, a citizen of the United States, a resident of Riverview Manor, Westchester County, State of New York, have invented an Improvement in Electrically-Driven Vehicles, of which the following is a specification.

My present invention relates to electrically driven vehicles and more particularly, but not so limited, to comparatively small vehicles which are designed and intended to derive their power from an outside source of current, such as the usual house or lighting circuit.

It is the object of the present invention to devise vehicles of the character specified briefly above, which shall be very simple in construction, which may be readily manufactured, and which may for that reason be sold at a price which will recommend itself to a very wide class of purchasers, which shall be simple to operate, in fact so simple that a child can readily and safely operate the same, and which shall be so constructed and designed as to avoid any chance of danger to the child or other person operating the same.

In one of its forms, my present invention comprises means, such as a flexible connecting cable, for supplying electric current to the electric motor driving the vehicle, from any suitable outside source of power, such as the ordinary house or lighting circuit. Preferably the flexible connecting cable is so constructed and designed as to be readily and easily disconnectible upon a predetermined degree of tension being applied to the same at the limit of its length.

The invention aims also to provide simple but highly ingenious and efficient driving and reversing mechanism for the vehicle, the said driving and reversing mechanism being preferably so constructed, designed, and arranged, as to act as a brake in changing from forward to reverse speed, or vice versa. The vehicle of the present invention, in one of its forms is capable of propulsion in any desired direction and to any point within the circle defined by the radius having as its length the length of the flexible connecting cable.

In the accompanying specification I shall describe, and in the annexed drawing show, a preferred embodiment of the present invention. It is, however, to be clearly understood that my invention is not limited to the embodiment thereof herein shown and described for purposes of illustration only.

Referring to the drawings, wherein I have shown the aforesaid illustrative embodiment of the present invention.

Figure 1 is a top plan view of the aforesaid illustrative embodiment of the present invention; and Figure 2 is a view in side elevation, partly in section, of the same.

Referring to the said illustrative embodiment of the present invention, 10 indicates the body or chassis of the vehicle, in the present instance comprising a substantially rectangular base or platform, as of wood, and a forward member 11 suitably attached to the member 10, as by means of screws or other fastening devices 12. At 13 I have indicated the front axle which is pivotally attached to the forward member 11, as at the pivot 14, and which carries the freely rotatable or "loose" front wheels 15 and 16.

At 17 I have indicated the rear axle, which is suitably attached to the base or body portion 10 of the vehicle and which carries the rear wheels 18 and 19, of which the wheel 18 is freely rotatable or "loose," while the wheel 19 is suitably attached to the rear axle 17 so as to rotate with the same and thus propel the vehicle when the axle is rotated in the manner subsequently set forth in detail.

At 20, I have indicated an inclined board or other member serving as a seat for the driver of the vehicle, and provided with a front portion 21 in the form of a narrow board or equivalent member to give the seat 20 the proper inclination. Cooperating with the seat 20 is a back supporting member 22 which cooperates with the top and rear members 23 and 24 and the side members 25 and 26 to provide a housing, generally indicated by reference character 27, for the operating parts of the vehicle. Ready access may be had to the interior of the housing 27 by providing suitable removable fastening means, generally indicated by reference character 28, for the top, rear and side members 23, 24, 25 and 26, respectively, of the housing 27, thus rendering these portions of the housing readily removable and freely detachable by means of the removable fastening devices 28.

In order that the vehicle may have the desired flexibility of operation, together with forward and reverse speeds, and also means for readily reversing the direction of propulsion of the vehicle, and in order also, that I may provide suitable means for associating suitable reduction gearing with the motor to accommodate its normally rapid speed of rotation to the comparatively low speed of rotation of the driving gear, I prefer to use the following arrangement, although other equivalent arrangements may be employed where the same serve the same general purposes:

On a platform 30, which is pivoted at 31 to the base 10, I mount an electric motor 32, having the usual armature shaft 33 which carries at its outer end the pinion 34. For many purposes, especially where the vehicle is intended to be used by children and high speeds of propulsion are not desired, the motor may be of as small a horse power as one-eighth or one-quarter of a horse power. Preferably, also, the motor is of the universal type, capable of using either direct or alternating current.

The pinion 34 meshes with another pinion 35, carried on a suitable shaft 36, suitably mounted for rotation within the frame 37 of the motor 32. The ratio of the gears 34 and 35 is such as to enable these gears to serve as suitable reduction gearing for the motor and the driving shaft 36, which latter carries at one end the pinion 35 and at its other end the drive pulley 38, which is preferably of the friction type.

The various parts of the motor and the associated reduction gear and driving mechanism thus far described are all carried by the tiltable platform 30. I shall now describe those parts of the driving and propelling mechanism which are not carried by the tiltable platform 30. Such parts comprise principally a driven pulley 39, preferably of the friction type, which is carried by the rear axle 17, as more clearly shown in Figure 2 of the drawing. By the suitable rotation of the driven pulley 39, which is keyed or otherwise affixed to the rear axle 17, the rear axle 17 is caused to rotate, carrying with it the driven wheel 19, which is similarly keyed or otherwise affixed to the rear axle so as to rotate with the same.

The means for reversing the direction of propulsion of the vehicle may comprise an arm 40, pivoted as at 41 to the rear portion of the base or platform 10, and carrying at its upper end the reverse pulley 42, which may also be of the friction type, for co-operation either with the driven pulley 39, alone, in the "idle" position of the latter, for the forward propulsion of the vehicle, or with both the driving pulley 38 and the driven pulley 39, in its active position, for the rearward propulsion of the vehicle.

In order to assure that the reverse pulley 42 has proper frictional contact with the driven pulley 39, I provide means for adjusting the degree of frictional contact between the two pulleys just referred to. Preferably such adjusting means comprises a rod 43 attached at one end to the arm 40 carrying the reverse pulley 42, and having its other end threaded, as shown at 44. Over the threaded end 44 of the rod 43 passes an adjusting bolt 45 bearing against an abutment 46. It is obvious that by the suitable manipulation of the adjusting bolt 45, which is internally threaded so as to co-operate with the external threads of the outer end 44 of the rod 43, the degree of friction between the reverse pulley 42 and the driven pulley 39 may be readily adjusted to any desired extent.

In order to manipulate the reversing mechanism for reversing the direction of propulsion of the vehicle, I provide what may be termed a clutch operating lever 47, provided with the operating handle 48 and pivoted, as at 49, to the base or platform 10. At a point removed from the pivot point 49, the clutch lever 47 is provided with a link 50 pivoted to the clutch operating member 47, as at 51. At 52 I have indicated an operating member in the form of a rod pivoted at a point 53 intermediate its ends to the base or platform 10, and pivotally connected at one of its ends to the link 50, as at 54. At its other end, indicated by reference character 55, the rod 52 is pivotally connected to an extension 56, rigidly connected to the tiltable platform 30 carrying the motor 32, the reduction gear and certain portions of the driving mechanism.

Current is supplied to the motor 32 at the terminals 57 and 58 of the same, by means of a flexible connecting cable 59, provided at its outer free end with a suitable connection plug 60, preferably of the "prong" type, for ready connection with a cooperating base plug 61, which is carried at one end of a flexible cable 62 carrying at its other end a suitable connection plug 63', preferably of the "prong" type, for ready connection with a cooperating base plug 64'. One cable 62 is of any suitable or desired length, depending upon the radius of the circle within which it is desired that the vehicle shall be operated.

The connectors 59 and 62, and the plugs 61, 63' and 64', are so constructed and arranged as to permit of the ready disconnection of the cable 62, supplying current to the motor 32 from the outside source of current at the base plug or other connection device 64', from either of the base plugs 61 or 64', or both, when a predetermined degree of tension is applied to the cable 62. This may readily happen when the vehicle has travelled a distance from the connection device 64' equal to the length of the cable 62. Accordingly, in order to avoid any undesirable tension and strain upon the various connections, and particularly upon the motor carried by the tiltable platform, by an undesirable degree of pressure being applied to the cable 62, the cable will be readily disconnected and the current will thus automatically be cut off from the motor, stopping the vehicle.

At 63, I have indicated what may be termed a dashboard, which carries any suitable electric switch, preferably of the snap type, and indicated by reference character 64, for closing or opening the circuit to the electric motor 32. At 65, I have indicated suitable steering means which may include a forked member 66 rigidly attached to the front axle 13, and provided at its upper end with a steering wheel 66' which can be swung to the left or to the right, as desired, for steering the vehicle.

The operation of the vehicle described above, and the advantages of the same in use, may be readily perceived from the foregoing description. Upon the operator taking his seat on the vehicle, and suitably operating the switch 64 to close the current through the motor, he operates the handle 48 of the clutch operating lever 47 rearwardly, or towards himself, which brings the drive pulley 38 out of its neutral or intermediate position between the reverse pulley 42 and the driven pulley 39, in which position it is out of contact with both of these pulleys, into a position of firm frictional engagement with the driven pulley 39, carried by the rotatable rear axle 17. This causes the propulsion of the vehicle in a forward direction. Current is readily supplied to the motor through the flexible cable 59, which, as already stated above, is readily disconnectible so that at the end of the length of the cable, should any undesirable tension be applied to the same, the cable will be readily disconnected, thus serving to interrupt the current otherwise going to the motor 32.

During the forward propulsion of the vehicle, the same may be steered in any desired direction, to any point within the circle having as its center the base plug or floor-connection 61, and defined by the radius having the length of the cable 59, just as if there were no outside connecting cable limiting the freedom of propulsion of the vehicle.

If the driver now desires to stop the vehicle, he may operate the clutch operating lever 47 by means of the handle 48 into a neutral or intermediate position, by pushing the same slightly in a forward direction until the drive pulley 38 assumes its neutral or intermediate position between the reverse pulley 42 and the driven pulley 39, in which position it is out of contact with both of the pulleys last referred to. In this position, the drive pulley 38 will be idly running with the motor going but with the vehicle at rest.

Should the driver now desire to reverse the direction of propulsion of the vehicle so that it will move backwards, he operates the clutch operating member 47, by means of the handle 48, in a forward direction, thus tilting the motor 32 carried by the platform 30 so as to bring the drive pulley 38 into contact with the reverse pulley 42 and out of contact with the driven pulley 39. This causes the propulsion of the vehicle in a reverse or backward direction. The normal directions of rotation of the drive and driven pulleys are indicated in Figure 1 of the drawing by the arrows.

It will be noted that where the reversing mechanism is operated to change the direction of propulsion of the vehicle, as from a forward direction to a rearward direction, or vice versa, this reversal of direction of propulsion is brought about without changing the direction of rotation of the armature shaft of the motor 32. At the same time, the reversal of direction of propulsion acts as a brake to slow up the vehicle in either direction of its initial propulsion, by the action of the various friction gears 38, 39 and 42.

The device is exceedingly simple in construction, so easy to operate that a young child can operate the same readily and with safety, and is altogether safe to entrust to young children. The removable closure of the motor housing 27 renders the ready inspection of the various moving parts of the vehicle convenient, while at the same time protecting such moving parts from tampering with and from injuring persons who might otherwise be injured by the same.

It is to be noted that the term "vehicle", as used in the specification and claims, and wherever such a meaning is consistent with the context, may include such devices as power-propelled lawn mowers and the like. It is also to be noted that by the term "reduction gearing", or its equivalent, as used in the specification and claims, and wherever such a meaning is consistent with the context, may include also gearing which increases, rather than reduces, the number of revolutions per minute of the driven shaft with respect to the driving shaft. It is also to be noted that any suitable reel or other take-up device may be used for taking up the loose portion or slack of the connecting cable.

What I claim is:

1. An electrically driven motor vehicle, comprising in combination, a wheel base, wheels supporting the same, certain of said wheels being readily dirigible so as to permit the vehicle to be propelled in any desired direction, an electric motor mounted on said wheel base and operatively connected to at least one of said wheels so as to drive the same and thus propel the vehicle, a flexible conducting cable connecting said electric motor to a suitable outside source of current for supplying current to said motor, and means for rendering said cable freely disconnectible upon a predetermined amount of tension being applied to the same.

2. In a vehicle of the character described, a wheel base, wheels supporting the same, a gear associated with one or more of said wheels, a hinged platform, an electric motor, a supply of current for said motor, means for readily disconnecting the motor from the supply of electricity when the vehicle is steered beyond a predetermined radius of operation, gearing on said motor adapted to cooperate with said gear, and manually operatable means pivoted to the wheel base for moving the platform, motor and gears into or out of engagement with said gear propelling or stopping the vehicle.

In testimony whereof, I have signed my name to this specification this 13th day of July, 1922.

M. EDGAR THOMAS.